United States Patent [19]

Tamura et al.

[11] Patent Number: 4,983,312

[45] Date of Patent: Jan. 8, 1991

[54] REFRIGERANTS

[75] Inventors: Koji Tamura, Kawanishi; Hiroshi Kashiwagi, Settsu; Masahiro Noguchi, Osaka, all of Japan

[73] Assignee: Daikin Industries, Ltd., Osaka, Japan

[21] Appl. No.: 358,364

[22] PCT Filed: Sep. 21, 1988

[86] PCT No.: PCT/JP88/00951

§ 371 Date: May 19, 1989

§ 102(e) Date: May 19, 1989

[87] PCT Pub. No.: WO89/02455

PCT Pub. Date: Mar. 23, 1989

[30] Foreign Application Priority Data

Sep. 21, 1987 [JP] Japan ................. 62-238439

[51] Int. Cl.$^5$ ............................................. C09K 5/04
[52] U.S. Cl. ................................... 252/67; 62/114
[58] Field of Search ........................... 252/67; 62/114

[56] References Cited

U.S. PATENT DOCUMENTS

| | | | |
|---|---|---|---|
| 3,607,755 | 9/1971 | Murphy et al. | 252/67 |
| 4,428,854 | 1/1984 | Enjo | 252/67 |
| 4,810,403 | 3/1989 | Bivens et al. | 252/67 |

FOREIGN PATENT DOCUMENTS

| | | | |
|---|---|---|---|
| 63-305185 | 12/1988 | Japan | 252/67 |
| 63-308084 | 12/1988 | Japan | 252/67 |
| 63-308085 | 12/1988 | Japan | 252/67 |

*Primary Examiner*—Paul Lieberman
*Assistant Examiner*—Christine A. Skane
*Attorney, Agent, or Firm*—Larson and Taylor

[57] ABSTRACT

The present invention provides a refrigerant comprising tetrafluoroethane and either chlorodifluoromethane or chlorodifluoroethane.

4 Claims, 2 Drawing Sheets

REFRIGERANTS

TECHNICAL FIELD

This invention relates to a working fluid for a refrigerator, which is called a refrigerant.

PRIOR ART AND PROBLEMS THEREOF

Refrigerants heretofore known include chlorofluoroalkanes, fluoroalkanes, azeotropic compositions thereof and other materials having a similar composition. These are generally called flons or flon refrigerants. Among them, chiefly used at present are dichlorodifluoromethane (hereinafter referred to as "Flon-12"), chlorodifluoromethane (hereinafter called "Flon-22") and the like. In recent years, however, it has been pointed out that certain kinds of flons released into the atmosphere would destroy the stratospheric ozone layer, thereby inflicting a serious adverse influence on the ecosystem including humans on the earth. Although said proposition may have yet to be scientifically and completely established, there is a tendency toward the control, under an international agreement, of use and production of flons which are likely to destroy the ozone layer. The flons to be controlled include Flon-12. With the spread of refrigerators and air-conditioning systems, the control over the use and production of flons, which are in greater demand year after year, greatly affects our residential environment and the current social framework as a whole. In consequence, there is an urgent demand for development of novel refrigerants having a high refrigerating performance, particularly a high coefficient of performance, which can substitute for Flon-12. Tetrafluoroethane may be offered as flons free of ozone layer-destroying risks but has the defect of being low in coefficient of performance.

The term "coefficient of performance" used herein means the ratio of refrigerating capacity to compressing work. The refrigerating capacity is the quantity of heat removed per a unit time from the substances being cooled, and the compressing work is the work volume achieved per a unit time by power for operating the refrigerator. Accordingly the coefficient of performance corresponds to the refrigeration efficiency of the refrigerant.

MEANS FOR SOLUTION OF THE PROBLEMS

We conducted extensive research to develop novel refrigerants which have a high coefficient of performance and which, when released into the atmosphere, would exert little influence on the ozone layer. Our research revealed that a refrigerant comprising tetrafluoroethane and chlorodifluoromethane or chlorodifluoroethane can exhibit a higher coefficient of performance than tetrafluoroethane.

The present invention, therefore, provides a refrigerant comprising tetrafluoroethane and either chlorodifluoromethane or chlorodifluorethane.

CONSTRUCTION OF THE INVENTION

Figure 1:
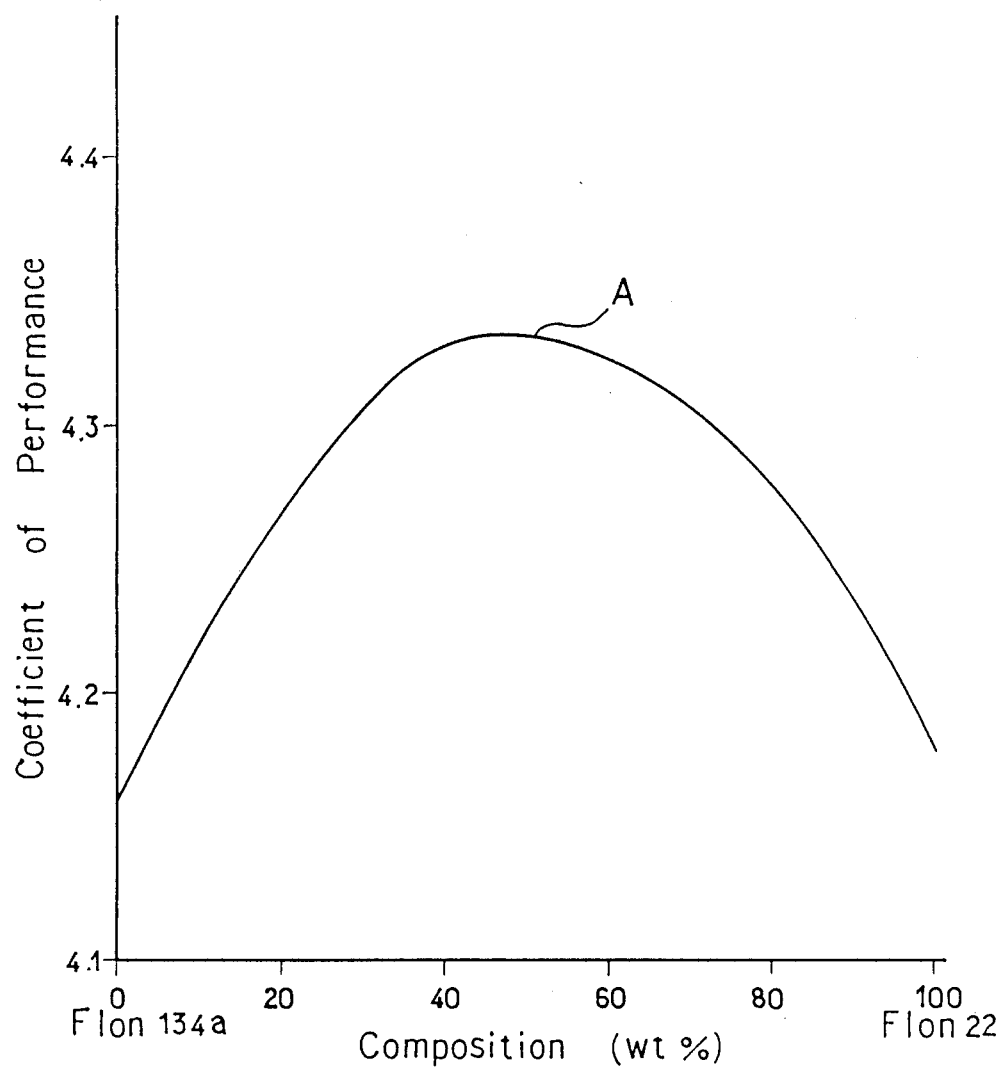
FIGS. 1 and 2 show graphs illustrating the refrigerating performance of the refrigerants according to the present invention.

Preferred refrigerant compositions of the invention are those comprising 95 to 5% by weight of tetrafluoroethane and 5 to 95% by weight of either chlorodifluoromethane o chlorodifluoroethane. Refrigerants containing chlorodifluoromethane or chlorodifluoroethane in the foregoing ratio have an improved coefficient of performance compared with tetrafluoroethane singly used. A preferable mixing ratio is as follows. Of refrigerants composed of tetrafluoroethane and chlorodifluoromethane, preferred are those comprising 90 to 5% by weight of the former and 10 to 95% by weight of the latter, and particularly preferred are those comprising 80 to 20% by weight of the former and 20 to 80% by weight of the latter. Of refrigerants composed of tetrafluoroethane and chlorodifluoroethane, preferred are those comprising 80 to 5% by weight of the former and 20 to 95% by weight of the latter. In particular, refrigerants composed of 80 to 20% by weight of tetrafluoroethane and 20 to 80% by weight of chlorodifluoromethane and those composed of 80 to 5% by weight of tetrafluoroethane and 20 to 95% by weight of chlorodifluoroethane can display a higher coefficient of performance than Flon-12.

Examples of tetrafluoroethane for use in the invention are 1,1,1,2-tetrafluoroethane (Flon-134a) and 1,1,2,2-tetrafluoroethane (Flon-134). Examples of chlorodifluoroethane for use herein are 1-chloro-1,1-difluoroethane (Flon-142b), 1-chloro-1,2-difluoroethane (Flon-142a) and 2-chloro-1,1-difluoroethane (Flon-142). Among the compositions of the invention, Flon-134a and Flon-134 can achieve a similar degree of effect and thus can be replaced by each other or mixed with each other in use. This can be done in respect of Flon-142a, Flon-142b and Flon-142.

RESULTS AND EFFECTS OF THE INVENTION

The refrigerants of the invention ar smaller in the ratio of specific heat and lower in the temperature of gas discharged from the compressor than Flon-22 and are consequently suitable for use as a cooling medium for a refrigeration cycle using a relatively high temperature as in an air-conditioning equipment of the heat pump type.

The composition of the invention is a nonazeotropic composition. Generally a single compound or an azeotrope is vaporized at a constant temperature in an evaporator because of its evaporation done under constant pressure, whereas a non-azeotropic composition has a low temperature at the inlet of the evaporator and a high temperature at the outlet thereof. On the other hand, a fluid to be cooled is caused to flow in countercurrent to the refrigerant in the evaporator to undergo heat exchange and thus has a temperature gradient along the flow direction even if the refrigerant is vaporized at a constant temperature. In other words, a temperature difference between the refrigerant and the fluid to be cooled diminishes in the evaporator as the fluid flows forwardly. In use, the refrigerant of the non-azeotropic composition according to the invention can be rendered close in temperature to the temperature gradient of the fluid to be cooled in the evaporator, so that the refrigeration efficiency, namely the coefficient of performance, can be enhanced.

EXAMPLES

The features of the present invention will be clarified below with reference to the following Examples and Comparison Example.

EXAMPLES 1 TO 6 AND COMPARISON EXAMPLE 1

Refrigerants were prepared by mixing together Flon-134a and Flon-22 in the various proportions shown below in Table 1 (weight ratio).

TABLE 1

|  | Flon-134a | Flon-22 |
| --- | --- | --- |
| Comp. Example 1 | 100 | 0 |
| Example 1 | 95 | 5 |
| Example 2 | 80 | 20 |
| Example 3 | 60 | 40 |
| Example 4 | 40 | 60 |
| Example 5 | 20 | 80 |
| Example 6 | 5 | 95 |

A refrigerator was operated with an output of 1 hp. using the refrigerants of the composition shown in Table 1. Each refrigerant started condensation at 50° C. in a condenser and had a temperature of 0° C. in the inlet of the evaporator with superheat of 5° C. Table 2 below shows (I) the maximum evaporating temperature (° C.), (II) refrigerating capacity (kcal/m³), (III) coefficient of performance and (IV) discharge temperature (° C.) at the compressor.

Table 2 also shows the results achieved by using Flon-134a alone (Comparison Example 1).

TABLE 2

|  | Maximum evaporating temperature (°C.) (I) | Refrigerating capacity (kcal/m³) (II) | Coefficient of performance (III) | Discharge temperature (°C.) (IV) |
| --- | --- | --- | --- | --- |
| Comp. Example 1 | 0.0 | 440 | 4.16 | 61.6 |
| Example 1 | 0.3 | 456 | 4.19 | 62.3 |
| Example 2 | 0.9 | 503 | 4.27 | 64.5 |
| Example 3 | 1.4 | 563 | 4.33 | 67.3 |
| Example 4 | 1.3 | 620 | 4.32 | 70.5 |
| Example 5 | 0.9 | 676 | 4.28 | 73.6 |
| Example 6 | 0.3 | 716 | 4.21 | 76.2 |

FIG. 1 indicates a graph illustrating the relationship between the proportions of Flon-134a and Flon-22 and the coefficient of performance (curve A).

The results shown in Table 2 and FIG. 1 reveal that the refrigerants of the present invention have outstanding properties.

EXAMPLES 7 TO 12

The properties of refrigerants were investigated in the same manner as in Examples 1 to 6 with the exception of using the refrigerants prepared by mixing together Flon-134a and Flon-142b in the various proportions (weight ratio) shown below in Table 3.

TABLE 3

|  | Flon-134a | Flon-142b |
| --- | --- | --- |
| Example 7 | 95 | 5 |
| Example 8 | 80 | 20 |
| Example 9 | 60 | 40 |
| Example 10 | 40 | 60 |
| Example 11 | 20 | 80 |
| Example 12 | 5 | 95 |

Table 4 shows (I) the maximum evaporating temperature (° C.), (II) refrigerating capacity (kcal/m³), (III) coefficient of performance and (IV) discharge temperature (° C.) at the compressor in respect of the refrigerants.

Figure 2:
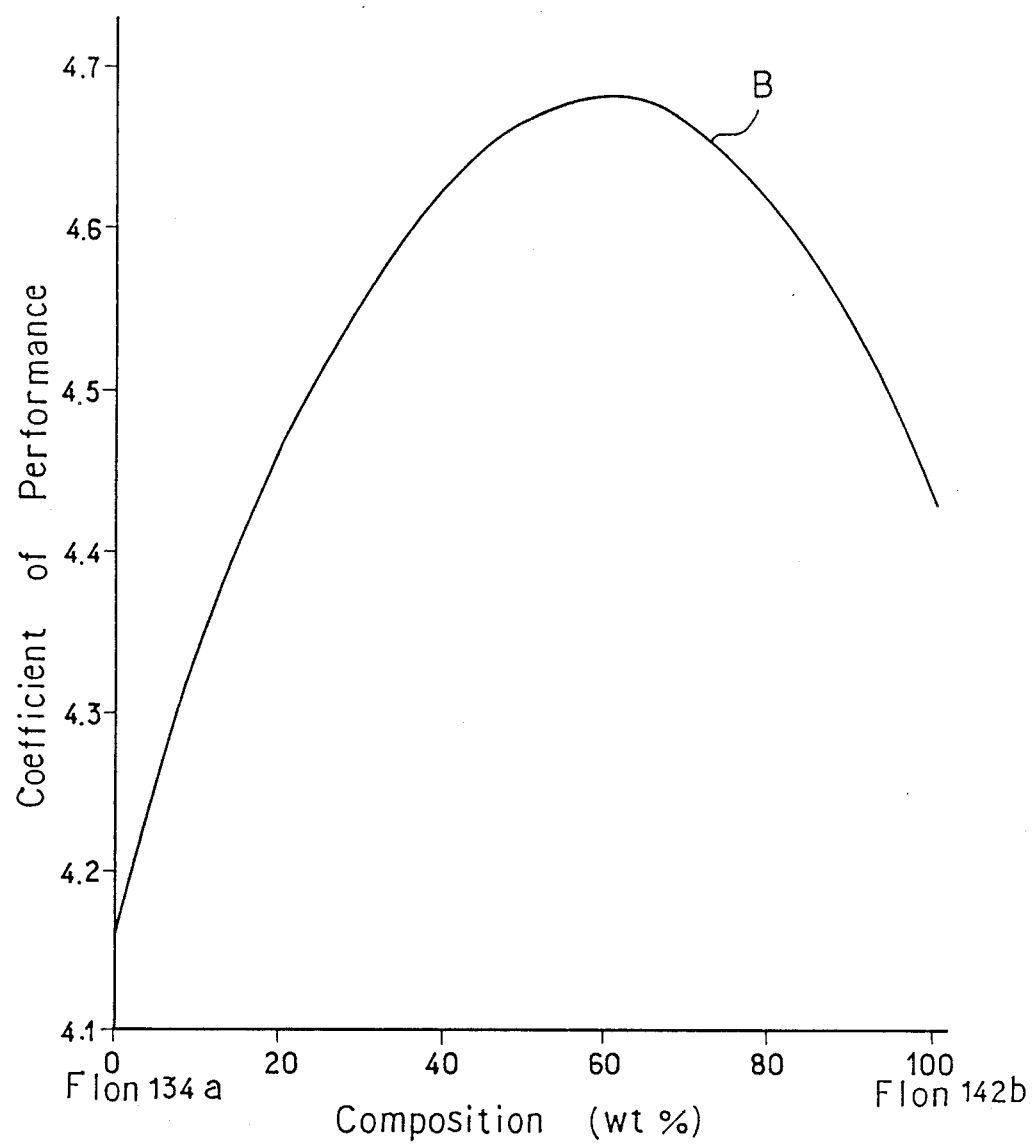

FIG. 2 indicates a graph illustrating the relationship between the proportions of Flon-134a and Flon-142b and the coefficient of performance (curve B).

TABLE 4

|  | Maximum evaporating temperature (°C.) (I) | Refrigerating capacity (kcal/m³) (II) | Coefficient of performance (III) | Discharge temperature (°C.) (IV) |
| --- | --- | --- | --- | --- |
| Example 7 | 0.5 | 431 | 4.24 | 61.4 |
| Example 8 | 1.6 | 402 | 4.46 | 60.7 |
| Example 9 | 2.2 | 363 | 4.63 | 60.0 |
| Example 10 | 2.1 | 323 | 4.68 | 59.3 |
| Example 11 | 1.4 | 281 | 4.61 | 58.9 |
| Example 12 | 0.4 | 251 | 4.48 | 58.7 |

We claim:

1. A refrigerant consisting essentially of 95 to 5% by weight of tetrafluoroethane and respectively 5 to 95% by weight of either chlorodifluoromethane or chlorodifluoroethane.

2. A refrigerant according to claim 1 consisting essentially of 90 to 5% by weight of tetrafluoroethane and respectively 10 to 95% by weight of chlorodifluoromethane.

3. A refrigerant according to claim 2 consisting essentially of 80 to 20% by weight of tetrafluoroethane and respectively 20 to 80% by weight of chlorodifluoromethane.

4. A refrigerant according to claim 1 consisting essentially of 80 to 5% by weight of tetrafluoroethane and respectively 20 to 95% by weight of chlorodifluoroethane.

* * * * *

REEXAMINATION CERTIFICATE (3906th)

United States Patent
Tamura et al.

[19]

[11] B1 4,983,312

[45] Certificate Issued Oct. 19, 1999

[54] REFRIGERANTS

[75] Inventors: Koji Tamura, Kawanishi; Hiroshi Kashiwagi, Settsu; Masahiro Noguchi, Osaka, all of Japan

[73] Assignee: Daikin Industries, Ltd., Osaka, Japan

Reexamination Request:
No. 90/004,586, Mar. 20, 1997

Reexamination Certificate for:
Patent No.: 4,983,312
Issued: Jan. 8, 1991
Appl. No.: 07/358,364
Filed: May 19, 1989

[22] PCT Filed: Sep. 21, 1988
[86] PCT No.: PCT/JP88/00951
§ 371 Date: May 19, 1989
§ 102(e) Date: May 19, 1989
[87] PCT Pub. No.: WO89/02455
PCT Pub. Date: Mar. 23, 1989

[30] Foreign Application Priority Data

Sep. 21, 1987 [JP] Japan .................................. 62-238439

[51] Int. Cl.$^6$ .................................................. C09K 5/04
[52] U.S. Cl. ................................ 252/67; 62/114; 62/502
[58] Field of Search ................................ 252/67; 62/114, 62/502

[56] References Cited

U.S. PATENT DOCUMENTS

| | | | |
|---|---|---|---|
| 2,641,579 | 6/1953 | Benning | 252/67 |
| 4,172,043 | 10/1979 | Chein . | |
| 4,174,295 | 11/1979 | Bargigia et al. | 252/305 |
| 4,303,536 | 12/1981 | Orfeo et al. | 252/68 |
| 4,369,120 | 1/1983 | Stelz et al. | 252/68 |

FOREIGN PATENT DOCUMENTS

| | | |
|---|---|---|
| 1452267 | 8/1966 | France . |
| 2361454 | 4/1978 | France . |
| 2736500 | 2/1978 | Germany . |
| 53-40693 | 4/1978 | Japan . |
| 117580 | 6/1984 | Japan . |
| 212481 | 10/1985 | Japan . |
| 255885 | 12/1985 | Japan . |
| 7708731 | 2/1978 | Netherlands . |
| 1529429 | 10/1978 | United Kingdom . |

OTHER PUBLICATIONS

Research Disclosure, No. 154, Feb. 1977, pp. 4, 5 disclosure No. 15405, Industrial Opportunities Ltd. Havant, GB; "Alloys satisfactory for use in lead acid electric storage batteries" (Abstract).

Patent Abstracts of Japan, vol. 8, No. 326 (C–249)(1673), Oct. 30th, 1984, JP 59–117580.

Chaikouskii et al. "Properties and Use of Mixtures of Agents in Compression Refrigerating Machines", Kholod Tech Techncl. 1972, No. 15, 56–61. (CA 79:33043a). no month available.

Research Disclosure, No. 146, Jun. 1976, pp. 13–14, Industrial Opportunities Ltd., Havant, Hampshire, GB "Hydrogen–containing chlorofluorocarbons" (Article).

*Primary Examiner*—Christine Skane

[57] ABSTRACT

The present invention provides a refrigerant comprising tetrafluoroethane and either chlorodifluoromethane or chlorodifluoroethane.

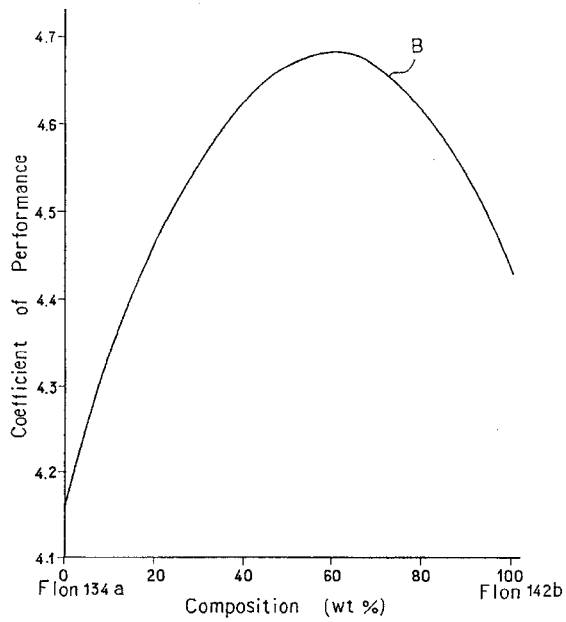

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2 and 3 are cancelled.

Claim 1 is determined to be patentable as amended.

Claim 4 dependent on an amended claim, is determined to be patentable.

New claims 5–8 are added and determined to be patentable.

1. A refrigerant consisting essentially of 95 to 5% by weight of tetrafluorethane and respectively 5 to 95% by weight of [either chlorodifluoromethane or] chlorodifluoroethane.

5. *A refrigeration system comprising:*

*a condenser;*

*an evaporator in fluid flow communication with the condenser; and*

*a refrigerant cycled through the condenser and evaporator;*

*wherein the refrigerant consists essentially of 95 to 5% by weight of tetrafluoroethane and respectively 5 to 95% by weight of either chlorodifluoromethane or chlorodifluoroethane.*

6. *A refrigeration system according to claim 5, wherein the refrigerant consists essentially of 90 to 5% by weight of tetrafluoroethane and respectively 10 to 95% by weight of chlorodifluoromethane.*

7. *A refrigeration system according to claim 6, wherein the refrigerant consists essentially of 80 to 20% by weight of tetrafluoroethane and respectively 20 to 80% by weight of chlorodifluoromethane.*

8. *A refrigeration system according to claim 5, wherein the refrigerant consists essentially of 80 to 5% by weight of tetrafluoroethane and respectively 20 to 95% by weight of chlorodifluoroethane.*

* * * * *